(12) United States Patent
Hayakawa et al.

(10) Patent No.: US 11,264,148 B2
(45) Date of Patent: Mar. 1, 2022

(54) COMPOSITE CABLE AND COMPOSITE HARNESS

(71) Applicant: Hitachi Metals, Ltd., Tokyo (JP)

(72) Inventors: Yoshikazu Hayakawa, Tokyo (JP); Tomoyuki Murayama, Tokyo (JP); Hirotaka Eshima, Tokyo (JP); Fumihito Oka, Tokyo (JP); Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 889 days.

(21) Appl. No.: 16/065,525

(22) PCT Filed: Dec. 25, 2015

(86) PCT No.: PCT/JP2015/086236
§ 371 (c)(1),
(2) Date: Jun. 22, 2018

(87) PCT Pub. No.: WO2017/109939
PCT Pub. Date: Jun. 29, 2017

(65) Prior Publication Data
US 2021/0210251 A1    Jul. 8, 2021

(51) Int. Cl.
*H01B 7/18* (2006.01)
*B60R 16/02* (2006.01)
(Continued)

(52) U.S. Cl.
CPC ....... *H01B 7/1855* (2013.01); *B60R 16/0207* (2013.01); *H01B 7/0045* (2013.01);
(Continued)

(58) Field of Classification Search
None
See application file for complete search history.

(56) References Cited

U.S. PATENT DOCUMENTS 2,243,851 A *  6/1941 Booth ............. H04B 3/32
                                         455/14
2,446,387 A *  8/1948 Peterson .......... H01B 9/02
                                         174/105 SC
(Continued)

FOREIGN PATENT DOCUMENTS

JP      S 44-16105 Y1   7/1969
JP      S 51-26777 Y1   7/1976
(Continued)

OTHER PUBLICATIONS

Japanese Office Action, dated Sep. 10, 2019, in Japanese Application No. 2017-557621 and English Translation thereof.
(Continued)

*Primary Examiner* — Timothy J. Dole
*Assistant Examiner* — Muhammed Azam
(74) *Attorney, Agent, or Firm* — McGinn I.P. Law Group, PLLC

(57) ABSTRACT

A composite cable includes a pair of first electric wires, a twisted pair wire formed by twisting a pair of second electric wires having a smaller outer diameter than the first electric wires, a tape member wound into a spiral around an assembly that is formed by twisting the pair of first electric wires and the twisted pair wire together, and a sheath covering an outer periphery of the tape member. The tape member and the sheath includes an inwardly projecting part formed in a spiral along a cable longitudinal direction and formed so as to enter inward at least one of a valley part between the two first electric wires and valley parts between the first electric wires and the twisted pair wire. The inwardly projecting part has a projecting length of not less than 3% of an outer diameter of the first electric wires.

18 Claims, 4 Drawing Sheets

(51) Int. Cl.
  *H01B 7/00* (2006.01)
  *H01B 9/00* (2006.01)
  *H01B 11/02* (2006.01)
  *B60T 13/74* (2006.01)

(52) U.S. Cl.
  CPC ............ *H01B 9/003* (2013.01); *H01B 11/02* (2013.01); *B60T 13/74* (2013.01); *B60T 2270/10* (2013.01)

(56) References Cited

U.S. PATENT DOCUMENTS

| | | | | |
|---|---|---|---|---|
| 2,981,788 A * | 4/1961 | Bunish | H01B 9/028 | 174/115 |
| 3,032,604 A * | 5/1962 | Timmons | H01B 11/1016 | 174/115 |
| 3,209,064 A * | 9/1965 | Cutler | H01B 11/00 | 174/36 |
| 3,595,982 A * | 7/1971 | Kafka | H01B 12/14 | 174/15.5 |
| 3,644,659 A * | 2/1972 | Campbell | H01B 11/10 | 174/27 |
| 3,673,315 A * | 6/1972 | Lasley | H01B 9/022 | 174/107 |
| 4,374,299 A * | 2/1983 | Kincaid | H01B 11/1091 | 174/105 SC |
| 4,398,058 A * | 8/1983 | Gerth | H01B 7/202 | 174/106 D |
| 4,486,619 A * | 12/1984 | Trine | H01B 7/0876 | 174/34 |
| 4,684,766 A * | 8/1987 | Tanaka | H01B 9/02 | 174/105 SC |
| 4,687,294 A * | 8/1987 | Angeles | G02B 6/443 | 174/121 A |
| 4,755,629 A * | 7/1988 | Beggs | H01B 11/02 | 174/115 |
| 5,565,653 A * | 10/1996 | Rofidal | H01B 11/02 | 174/113 R |
| 6,444,902 B1* | 9/2002 | Tsao | H01B 7/0861 | 174/113 R |
| 6,486,395 B1* | 11/2002 | Temblador | H01B 9/02 | 174/102 R |
| 6,803,518 B2* | 10/2004 | Chang | H01B 11/002 | 174/113 R |
| 7,038,138 B2* | 5/2006 | Laity | H01R 13/72 | 174/113 R |
| 7,115,815 B2* | 10/2006 | Kenny | H01B 11/04 | 174/113 R |
| 7,166,802 B2* | 1/2007 | Cusson | H01B 7/20 | 174/105 R |
| 8,735,725 B2* | 5/2014 | Li | H05K 9/0098 | 174/107 |
| 9,959,954 B1* | 5/2018 | Jackson | H02G 3/0468 | |
| 10,002,689 B2* | 6/2018 | Straniero | H01B 9/028 | |
| 10,102,944 B2* | 10/2018 | Kohori | H01B 7/28 | |
| 10,566,107 B2* | 2/2020 | Kohori | H01B 3/30 | |
| 10,672,538 B2* | 6/2020 | Kobayashi | H01B 9/003 | |
| 2001/0013418 A1* | 8/2001 | Donner | H01B 11/02 | 174/27 |
| 2005/0056454 A1* | 3/2005 | Clark | H01B 11/02 | 174/113 R |
| 2006/0021786 A1* | 2/2006 | Fetterolf, Sr. | H01B 9/003 | 174/113 R |
| 2006/0021787 A1* | 2/2006 | Fetterolf, Sr. | H01B 7/225 | 174/113 R |
| 2008/0277138 A1* | 11/2008 | Gallens | D07B 1/148 | 174/111 |
| 2009/0000688 A1* | 1/2009 | Hopkinson | H01B 11/02 | 140/119 |
| 2011/0278043 A1* | 11/2011 | Ueda | H01B 7/1895 | 174/115 |
| 2014/0326480 A1* | 11/2014 | Hashimoto | H01B 7/295 | 174/113 R |
| 2017/0229212 A1* | 8/2017 | Hayakawa | B60R 16/0215 | |
| 2017/0236617 A1* | 8/2017 | Hayakawa | H01B 7/0241 | 174/72 A |
| 2017/0264062 A1* | 9/2017 | Hayakawa | B60T 7/107 | |
| 2020/0013524 A1* | 1/2020 | Eshima | H01B 11/02 | |
| 2020/0185128 A1* | 6/2020 | Hayakawa | H01B 9/003 | |

FOREIGN PATENT DOCUMENTS

| | | |
|---|---|---|
| JP | H06-267336 A | 9/1994 |
| JP | 2014-220043 A | 11/2014 |
| WO | WO 2013/111718 A1 | 8/2013 |

OTHER PUBLICATIONS

Japanese Office Action, dated Oct. 22, 2020, in Japanese Application No. 2017-557621 and English Translation thereof.
International Search Report (ISR) (PCT Form PCT/ISA/210), in PCT/JP2015/086236, dated Mar. 1, 2016.
Japanese Office Action, dated Dec. 3, 2019, in Japanese Application No. 2017-557621 and English Translation thereof.
Notification of Transmittal of translation of the International Preliminary Report on Patentability dated Jul. 5, 2018 in corresponding International Application No. PCT/JP2015/086236(PCT/IB/338).

* cited by examiner

COMPOSITE CABLE AND COMPOSITE HARNESS

TECHNICAL FIELD

The present invention relates to a composite cable and a composite harness, in particular, to a composite cable and a composite harness which are used in a vehicle for connection between a wheel side and a vehicle body side.

BACKGROUND ART

In recent years, electrically operated brake units are used in vehicles such as automobiles. Electro-mechanical brakes (EMB) and electric parking brakes (EPB), etc., are known as such electrically operated brake units.

The electro-mechanical brakes, also simply called electric friction brake or electric brake, are configured that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver.

The electric parking brakes are configured that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Meanwhile, in recent years, sensors, e.g., ABS (Anti-Lock Brake System) sensor for detecting the speed of a wheel rotation during motion, air pressure sensor for detecting air pressure of a tire and temperature sensor, etc., are often mounted on wheels of vehicles.

Accordingly, the wheel side and the vehicle body side are connected through composite cables in which a signal line for a sensor mounted on a wheel or a signal line for controlling an electro-mechanical brake and a power line for supplying power to an electric motor of electro-mechanical brake or electric parking brake are housed in one sheath.

The composite cables with connectors integrally provided at end portions are called composite harness.

JP 2014/220043 A proposes a composite cable provided with plural power lines, plural signal lines, a tape member spirally wound to cover the plural power lines and the plural signal lines, and a sheath covering the tape member.

When the sheath is provided directly around the power lines or the signal lines, it is necessary to apply a lubricant such as talc powder around electric wires so that the sheath can be easily removed from the power lines or the signal lines. On the other hand, when providing the tape member around the power lines and the signal lines, it is possible to easily remove the sheath from the power lines and the signal lines without applying a lubricant around the power lines and the signal lines. That is, when using the composite cable disclosed in JP 2014/220043 A, a decrease in workability due to lubricant scattered during work such as cable termination can be prevented.

CITATION LIST

Patent Literature

JP 2014/220043 A

SUMMARY OF INVENTION

Technical Problem

In the composite cable disclosed in JP 2014/220043 A, however, since the tape member is wound around plural electric wires, there is a problem that a relatively large hollow portion is formed around each electric wire (between the electric wires or between the electric wires and the tape member) and buckling is thus likely to occur when the composite cable is bent or twisted.

In addition, in the composite cable disclosed in JP 2014/220043 A, the tape member may move in a cable longitudinal direction when the composite cable is repeatedly bent or twisted, which may cause various problems such as a decrease in flexibility due to overlapping of the tape member at some portions of the composite cable.

Thus, it is an object of the invention to provide a composite cable and a composite harness that are unlikely to cause the buckling and capable of preventing the movement of the tape member in the cable longitudinal direction.

Solution to Problem

To solve the above-mentioned problems, the invention provides a composite cable comprising:
  a pair of first electric wires;
  a twisted pair wire formed by twisting a pair of second electric wires having a smaller outer diameter than the first electric wires;
  a tape member wound into a spiral around an assembly that is formed by twisting
  the pair of first electric wires and the twisted pair wire together; and
  a sheath covering an outer periphery of the tape member,
  wherein a twisting direction of the assembly and a winding direction of the tape member are the same,
  wherein the tape member and the sheath comprise an inwardly projecting part formed in a spiral along a cable longitudinal direction and formed so as to enter inward at least one of a valley part between the two first electric wires and valley parts between the first electric wires and the twisted pair wire, and
  wherein the inwardly projecting part has a projecting length of not less than 3% of an outer diameter of the first electric wires defined in projecting inside from an outermost of common tangents passing through outer perimeters of the first electric wires, or the first electric wire and the twisted pair wire, circumferentially adjacent with the inwardly projecting part interposed therebetween.

To solve the above-mentioned problems, the invention also provides a composite harness comprising:
  the composite cable, and
  a connector attached to at least one of end portions of the first electric wires and the second electric wires.

Advantageous Effects of Invention

According to the invention, a composite cable and a composite harness can be provided that are unlikely to cause the buckling and capable of preventing the movement of the tape member in the cable longitudinal direction.

DESCRIPTION OF EMBODIMENTS

Embodiment

An embodiment of the invention will be described below in conjunction with the appended drawings.

Description of Vehicle in which a Composite Cable is Used

Figure 1:
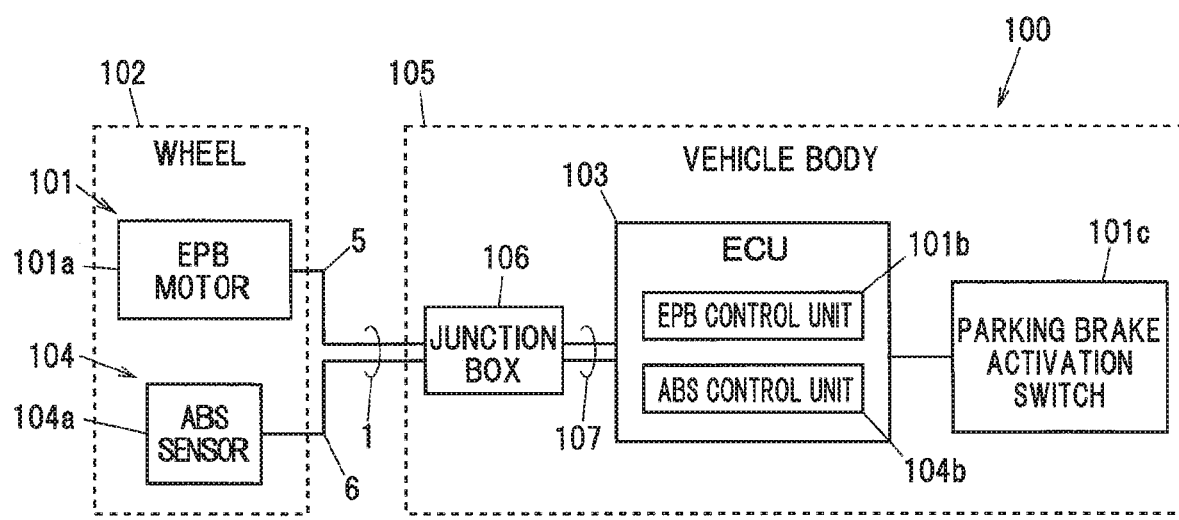
FIG. 1 is a block diagram illustrating a configuration of a vehicle in which a composite cable in an embodiment of the present invention is used.

FIG. 1 is a block diagram illustrating a configuration of a vehicle in which a composite cable in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is a wheel-side device mounted on a wheel 102 of the vehicle 100. The EPB control unit 101b is mounted on an ECU (electronic control unit) 103 which is a vehicle body-side device of the vehicle 100. Alternatively, the control unit 101b may be mounted on a control unit other than the ECU 103, or may be mounted on a dedicated hardware unit.

The EPB motor 101a is provided with a piston to which brake pads are attached even though it is not illustrated, and it is configured that the piston moved by rotary drive of the EPB motor 101a presses the brake pads against a disc rotor of a wheel (the wheel 102) to generate a braking force. A pair of first electric wires 5 as power lines is connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state during the stationary state of the vehicle 100 so that the brake pads are pressed against the disc rotor of the wheel 102 and a braking force to be applied to the wheel 102 is generated. The EPB control unit 101b is configured to output a drive current to the EPB motor 101a also when the parking brake activation switch 101c is turned from the ON state to the OFF state or when an accelerator pedal is depressed so that the brake pads move away from the disc rotor of the wheel and the braking force on the wheel 102 is released. In other words, it is configured that an operating state of the EPB 101 is maintained from when the parking brake activation switch 101c is turned on to when the parking brake activation switch 101c is turned off or the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is a rotation speed detection sensor mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 so that the wheel 102 is not locked when suddenly stopped. A pair of second electric wires 6 as signal lines is connected to the ABS sensor 104a.

Figure 2A:
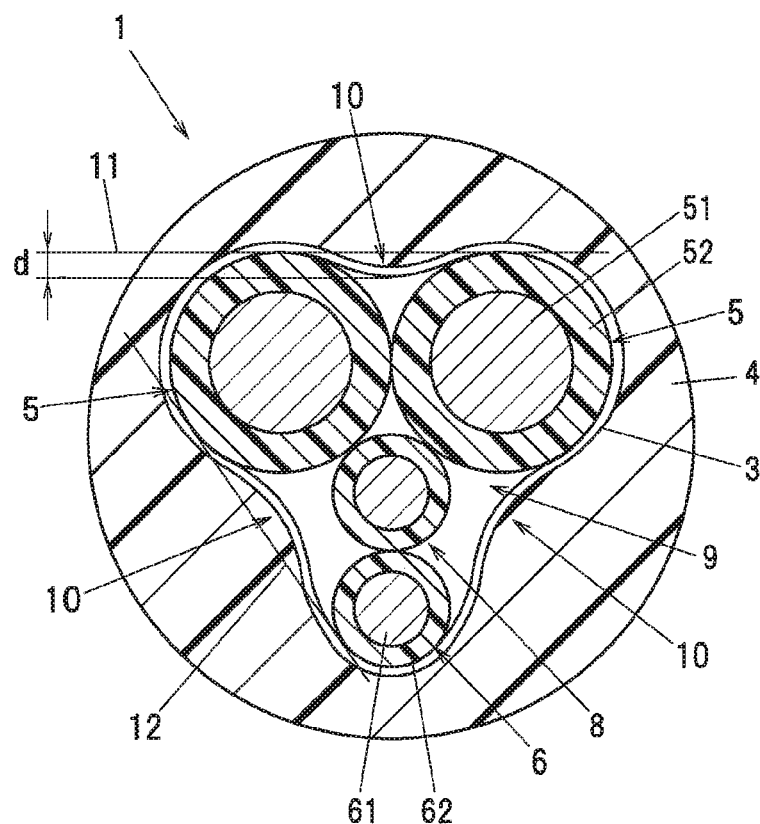
FIG. 2A is a cross sectional view showing the composite cable in the embodiment of the invention.
Figure 2B:
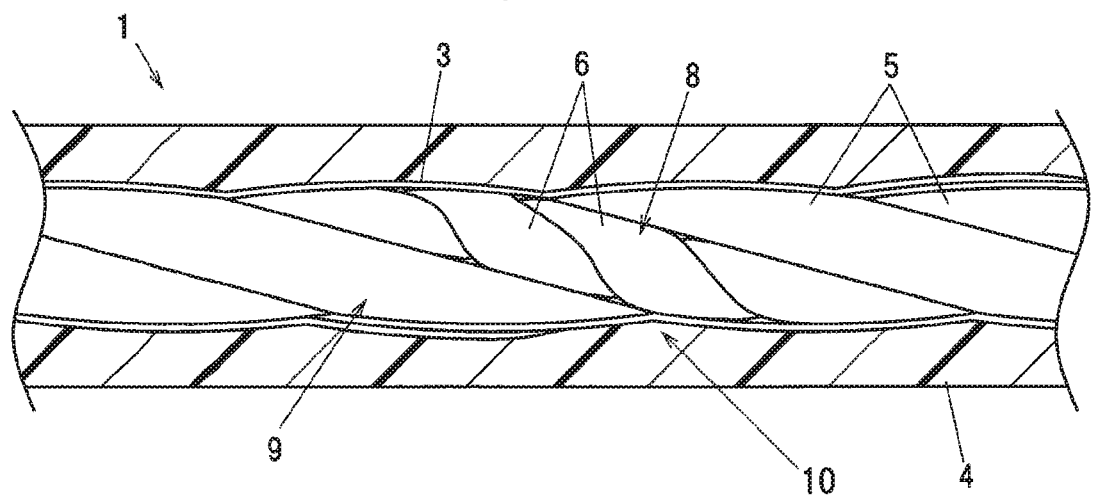
FIG. 2B is a broken sectional view of the composite cable in the embodiment of the invention, showing a sheath and a tape member on a cross section.

A composite cable 1 in the present embodiment is obtained by covering all the first electric wires 5 and the second electric wires 6 with a sheath 4 (see FIGS. 2A and 2B). The composite cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

Description of the Composite Cable 1

FIG. 2A is a cross sectional view showing the composite cable 1 in the present embodiment and FIG. 2B is a broken sectional view showing a sheath and a tape member on a cross section.

As shown in FIGS. 2A and 2B, the composite cable 1 is provided with the pair of first electric wires 5, a twisted pair wire 8 formed by twisting the pair of second electric wires 6 having a smaller outer diameter than the first electric wires 5, a tape member 3 spirally wound around an assembly 9 which is formed by twisting the pair of first electric wires 6 and the twisted pair wire 8 together, and the sheath 4 provided to cover the periphery of the tape member 3.

In the present embodiment, the pair of first electric wires 5 are power lines for supplying a drive current to the motor 101a for the EPB 101 mounted on the wheel 102 of the vehicle 100. Meanwhile, in the present embodiment, the pair of second electric wire 6 are signal lines for the ABS sensor 104a mounted on the wheel 102.

The first electric wire 5 is configured such that a first conductor 51 formed by twisting highly conductive strands of copper, etc., is covered with a first insulation 52 formed of an insulating resin such as cross-linked polyethylene.

Strands having a diameter of not less than 0.05 mm and not more than 0.30 mm can be used to form the first conductor 51. When using strands having a diameter of less than 0.05 mm, sufficient mechanical strength may not be obtained, causing a decrease in flex resistance. When using strands having a diameter of more than 0.30 mm, flexibility of the composite cable 1 may decrease.

The outer diameter of the first conductor 51 and the thickness of the first insulation 52 of the first electric wire 5 are appropriately adjusted according to magnitude of required drive current. In the present embodiment, considering that the first electric wire 5 is a power line for supplying a drive current to the motor 101a for the EPB 101, the outer diameter of the first conductor 51 is set to not less than 1.5 mm and not more than 3.0 mm and the outer diameter of the first electric wire 5 is set to not less than 2.0 mm and not more than 4.0 mm.

The second electric wire 6 is an insulated wire in which a second conductor 61 formed by twisting highly conductive strands of copper, etc., is covered with a second insulation 62 formed of an insulating resin such as cross-linked polyethylene. Strands having a diameter of not less than 0.05 mm and not more than 0.30 mm can be used to form the second conductor 61, in the same manner as the first conductor 51.

The outer diameter of the second electric wire 6 is smaller than that of the first electric wire 5. In the present embodiment, the twisted pair wire 8 formed by twisting a pair (two) of second electric wires 6 is twisted with the pair of first electric wires 5. Therefore, from the viewpoint of making the outer shape of the composite cable 1 close to a circular shape, it is desirable to use the second electric wire 6 which is about half the outer diameter of the first electric wire 5. In detail, it is possible to use the second electric wire 6 which has an outer diameter of not less than 1.0 mm and not more than 1.8 mm and is formed using the second conductor 61 having an outer diameter of not less than 0.4 mm and not more than 1.0 mm.

A twist pitch of the twisted pair wire 8 is set by taking into account the outer diameter of the second electric wire 6 so that an unnecessary load is not applied to the second electric wires 6. The twist pitch of the twisted pair wire 8 here is about 30 mm, but the twist pitch of the twisted pair wire 8 is not limited thereto. The twist pitch of the twisted pair wire 8 is a distance along a longitudinal direction of the twisted pair wire 8 at which a given second electric wire 6 is located at the same position in a circumferential direction of the twisted pair wire 8.

The assembly 9 is formed by twisting the pair of first electric wires 5 and the twisted pair wire 8 together. In the present embodiment, the assembly 9 is configured so that the pair of first electric wires 5 are in contact with each other, the pair of second electric wires 6 are in contact with each other and the pair of first electric wires 5 are further in contact with the second electric wires 6 (twisted pair wire 8). In this configuration, the second electric wires 6 are at least partially arranged in an inner valley part formed between the pair of first electric wires 5.

In the EPB 101, a drive current is supplied to the motor 101*a* basically when the vehicle is stationary. On the other hand, the ABS sensor 104*a* is used when the vehicle is in motion, and the ABS sensor 104*a* is not used during when the drive current is supplied through the first electric wires 5. Therefore, in the present embodiment, a shield conductor around the twisted pair wire 8 is omitted. Omitting the shield conductor allows the composite cable 1 to have a smaller diameter than when providing the shield conductor and also reduces the number of components, thereby reducing the cost.

Although the first electric wire 5 for supplying a drive current to the EPB motor 101*a* is described here, the first electric wire 5 may be used to supply a drive current to, e.g., an electric motor of an electro-mechanical brake (hereinafter, referred as EMB) provided on the wheel 102. In this case, since an electric current is fed through the first electric wires 5 also during motion of the vehicle 100, it is desirable to provide a shield conductor around the twisted pair wire 8 or around the pair of first electric wires 5 to prevent malfunction of the ABS device 104 due to noise. Alternatively, the pair of first electric wires 5 may be shielded wires each of which has a shield conductor around the conductor, or the pair of second electric wires 6 may be shielded wires each of which has a shield conductor around the conductor.

Furthermore, although the second electric wire 6 as a signal line for the ABS sensor 104*a* is described here, the second electric wire 6 may be a signal line used for another sensor provided on the wheel 102, e.g., for a temperature sensor or an air pressure sensor for detecting air pressure of a tire, etc., or may be a damper wire used to control a damping device of the vehicle 100, or moreover, may be a signal line (a CAN cable, etc.) for controlling the EMB. Even when the first electric wire 5 is used to supply a drive current to the EPB motor 101*a*, it is desirable to provide a shield conductor around the twisted pair wire 8 in case of using the second electric wires 6 during the stationary state of the vehicle 100 to prevent malfunction due to noise.

The outer diameter of the assembly 9 formed by twisting the pair of first electric wires 5 and the twisted pair wire 8 together is, e.g., about 5 mm to 9 mm. A twist pitch of the assembly 9 is set by taking into account the outer diameter of the assembly 9 so that an unnecessary load is not applied to the first electric wires 5 and the twisted pair wire 8. The twist pitch of the assembly 9 here is about 60 mm, but the twist pitch of the assembly 9 is not limited thereto. The twist pitch of the assembly 9 is a distance along a longitudinal direction of the assembly 9 at which a given first electric wire 5 or the twisted pair wire 8 is located at the same position in a circumferential direction of the assembly 9.

The tape member 3 is spirally wound around the assembly 9, and the tape member 3 is in contact with all electric wires (the pair of first electric wires 5 and the twisted pair wire 8 (the pair of second electric wires 6)) which constitute the assembly 9. The tape member 3 is interposed between the assembly 9 and the sheath 4 and serves to reduce friction between the assembly 9 (the electric wires 5 and 6) and the sheath 4 when being bent and to make the first electric wires 5 and the twisted pair wire 8 separate easily from the sheath 4 at the time of termination. In other words, providing the tape member 3 can reduce friction between the assembly 9 and the sheath 4 without using a lubricant such as talc powder unlike the conventional cable and reduces stress applied to the electric wires 5 and 6 when being bent, and it is thereby possible to improve flex durability as well as workability at the time of termination.

The tape member 3 is desirably slidable (desirably has a low friction coefficient) with respect to the first insulation 52 of the first electric wire 5 and the second insulation 62 of the second electric wire 6, and can be formed of, e.g., a non-woven fabric, a paper or a resin (a resin film, etc.). In more detail, a material of the tape member 3 is selected so that the friction coefficient (coefficient of static friction) between the tape member 3 and the first and second insulations 52 and 62 is lower than the friction coefficient (coefficient of static friction) between the sheath 4 and the first and second insulations 52 and 62 without the tape member 3.

It is also possible to use the tape member 3 having a laminated structure composed of not less than two layers. In this case, the tape member 3 is configured so that a surface to be in contact with the assembly 9 is formed of any one of a non-woven fabric, a paper or a resin layer. For example, it can be configured such that the tape member 3 is formed by providing a resin layer on one side of a paper and is wound with the resin layer having a lower friction coefficient on the assembly 9 side.

The tape member 3 used in the present embodiment is formed of a polyester-based non-woven fabric having a thickness of 0.07 mm. The thickness of the non-woven fabric used as the tape member 3 is desirably not less than 0.03 mm and not more than 0.10 mm. This is because when the thickness of the non-woven fabric is less than 0.03 mm, a portion of the sheath 4 may penetrate through the tape member 3 and reach the assembly 9 during when applying the sheath 4, causing a decrease in workability at the time of termination. On the other hand, when the thickness of the non-woven fabric is more than 0.10 mm, the rigidity of the tape member 3 is increased and this may cause a decrease in flexibility of the composite cable 1.

The tape member 3 is spirally wound around the assembly 9 so as to overlap at a portion in a width direction (a direction perpendicular to the longitudinal direction and thickness direction of the tape member 3). The overlap width of the tape member 3 is, e.g., not less than ¼ and not more than ½ of the width of the tape member 3. In the present embodiment, the overlapping portion of the tape member 3 is not adhered by an adhesive, etc.

The width of the tape member 3 is determined so that creases are not formed on the tape member 3 when the tape member 3 is wound, and it is desirable that the width of the used tape member 3 be decreased with a decrease in the outer diameter of the entire assembly 9. In detail, when the outer diameter of the entire assembly 9 is 5 mm to 9 mm, the width of the tape member 3 is about 20 mm to 50 mm.

A winding pitch of the tape member 3, i.e., a distance along a longitudinal direction at which the tape member 3 is located at the same circumferential position (e.g., a distance between the widthwise edges), can be adjusted by changing the width of the tape member 3 and the overlap width thereof. However, if the width of the tape member 3 is increased and the winding pitch is also increased, the tape member 3 becomes close to the longitudinally wrapped state, resulting in that the composite cable 1 has less flexibility and becomes hard to bend. Therefore, the winding pitch of the tape member 3 is desirably not more than 50 mm.

The sheath 4 is provided around the tape member 3. The sheath 4 is formed of, e.g., a urethane resin. Although a shield conductor is omitted in the present embodiment since the first electric wires 5 are used to supply a drive current to the EPB motor 101a and the drive current flows through the first electric wires 5 in a relatively short time, a shield conductor may be provided between the tape member 3 and the sheath 4 or around the sheath 4 depending on the intended use, etc., of the first electric wires 5.

In the composite cable 1 of the present embodiment, the tape member 3 and the sheath 4 have an inwardly projecting part 10 formed in a spiral along a cable longitudinal direction and formed so as to enter inward at least one of valley parts formed between the two first electric wires 5 and between the first electric wires 5 and the twisted pair wire 8.

Although the inwardly projecting parts 10 are formed respectively in a valley part between the two first electric wires 5, in a valley part between one of the first electric wires 5 and the twisted pair wire 8 and in a valley part between the other first electric wire 5 and the twisted pair wire 8 in this example, the inwardly projecting part 10 only needs to be formed at least one of these valley parts. However, in view of preventing buckling of the composite cable 1 and restricting the movement of the tape member 3, it is desirable that the inwardly projecting parts 10 be formed in all valley parts.

In the composite cable 1, the both first electric wires 5 are in contact with the tape member 3 and the tape member 3 in contact with the sheath 4 at a valley part between one first electric wire 5 and the other first electric wire 5. In addition, in the composite cable 1, the first electric wire 5 and the twisted pair wire 8 (at least one of the second electric wire 6) are in contact with the tape member 3 and the tape member 3 in contact with the sheath 4 at a valley part between the first electric wire 5 and the twisted pair wire 8.

The inwardly projecting part 10 is formed to protrude inward beyond the outermost tangent (radially outward of the composite cable 1) among the common tangents passing through the outer perimeters of the first electric wires 5, or the first electric wire 5 and the twisted pair wire 8, which are circumferentially adjacent with the inwardly projecting part 10 interposed therebetween. The term "common tangent" here is a tangent which is perpendicular to the cable longitudinal direction.

Although the common tangents to the two first electric wires 5 are present on the inner and outer sides of the composite cable 1, the inwardly projecting part 10 in the valley part between the two first electric wires 5 is formed to protrude inward beyond the outer common tangent. In FIG. 2A, the common tangent passing through the outer perimeters of the two first electric wires 5 is denoted by a reference numeral 11.

The outer perimeter of the twisted pair wire 8 here includes both the outer perimeters of the two twisted second electric wires 6, and there are plural common tangents passing through the outer perimeters of the first electric wire 5 and the twisted pair wire 8. The inwardly projecting part 10 in the valley part between the first electric wire 5 and the twisted pair wire 8 is formed to protrude inward beyond the common tangent located outermost (the tangent which does not penetrate through any of the two second electric wires 6 in the cross sectional view) among the common tangents. In FIG. 2A, the tangent located outermost (on the outer peripheral side) among the common tangents passing through the outer perimeters of the first electric wire 5 on the left in the drawing and the twisted pair wire 8 is denoted by a reference numeral 12. Hereinafter, "the common tangent" means the outermost common tangent (located on the outer peripheral side) to simplify the description.

Since the inwardly projecting parts 10 are formed, hollow portions formed around the first electric wires 5 and the twisted pair wire 8 are reduced in size and buckling is thus less likely to occur even when the composite cable 1 is bent or twisted. In addition, since the tape member 3 enters the valley part between the first electric wires 5, or the first electric wire 5 and the twisted pair wire 8, circumferentially adjacent to each other, and is restricted from moving radially outward by the sheath 4, the tape member 3 is less likely to move in the cable longitudinal direction. In other words, since the tape member 3 is sandwiched between the sheath 4 and the assembly 9 (the first electric wire 5 or the twisted pair wire 8) at the valley part between one first electric wire 5 and the other first electric wire 5 and in the valley parts between the first electric wires 5 and the twisted pair wire 8, it is possible to prevent relative movement of the tape member 3 in the cable longitudinal direction.

In the present embodiment, an inwardly projecting length d of the inwardly projecting part 10 from the common tangent passing through the outer perimeters of the first electric wires 5, or the first electric wire 5 and the twisted pair wire 8, circumferentially adjacent with the inwardly projecting part 10 interposed therebetween (a distance between the common tangent and a top portion of the inwardly projecting part 10) is not less than 3% of the outer diameter of the first electric wire 5.

This is because if the projecting length d of the inwardly projecting part 10 is as small as less than 3% of the outer diameter of the first electric wire 5, a buckling prevention effect and an effect of preventing the movement of the tape member 3 may not be sufficiently obtained. The projecting length d of the inwardly projecting part 10 is more preferably not less than 10% of the outer diameter of the first electric wire 5 so that the buckling prevention effect and the effect of preventing the movement of the tape member 3 are obtained sufficiently.

When the outer diameter of the first electric wire 5 is, e.g., 3 mm, the projecting length d is desirably at least not less than 0.1 mm. To obtain an effect from having the inwardly projecting part 10, the projecting length d is desirably at least not less than 0.1 mm, preferably not less than 0.3 mm although it depends on the outer diameter of the electric wires 5 and 6 to be used. The projecting length d does not need to be fixed throughout and has some tolerance.

Meanwhile, when the projecting length d of the inwardly projecting part 10 is too large, workability at the time of termination (e.g., stripping work to remove the sheath 4) may decrease. Therefore, the projecting length d is desirably not more than 40%, preferably not more than 35% of the outer diameter of the plural first electric wires 5. The projecting length d is desirably not more than 1 mm in view of easy removal of the sheath 4 although it depends on the outer diameter of the electric wires 5 and 6 to be used.

When the twisting direction of the assembly 9 is different from the winding direction of the tape member 3, the tape member 3 is less likely to enter the valley part between the first electric wires 5 or between the first electric wire 5 and the twisted pair wire 8. Therefore, the twisting direction of the assembly 9 is the same direction as the winding direction of the tape member 3. In this case, when the tape member 3 is wound around the assembly 9 while applying an appropriate tensile force, the tape member 3 can easily enter the valley part between the first electric wires 5 or between the first electric wire 5 and the twisted pair wire 8. After the sheath 4 is applied around the tape member 3 by extrusion coating, the inwardly projecting part 10 is formed.

The twisting direction of the assembly 9 here is a direction that the first electric wires 5 and the twisted pair wire 8 rotate from the base end toward the front end when the composite cable 1 is viewed from the front end side (on the side where the tape member 3 overlaps upon itself). Meanwhile, the winding direction of the tape member 3 is a direction that the tape member 3 rotates from the base end toward the front end when the composite cable 1 is viewed from the front end side (on the side where the tape member 3 overlaps upon itself).

Since the twisting direction of the assembly 9 and the winding direction of the tape member 3 are the same, the twist of the assembly 9 spontaneously unravels by unwinding the tape member 3 when terminating the cable and it is easy to unravel the electric wires 5 and 6. This improves disassembly capability of the composite cable 1 and thereby improves cable termination workability.

In addition, since the twisting direction of the assembly 9 and the winding direction of the tape member 3 are the same, the assembly 9 and the tape member 3 are loosened or tightened synchronously when the composite cable 1 is distorted. This disperses a load caused by distortion and prevents an excess load from being applied to a certain portion of the composite cable 1, thereby improving distortion resistance.

If, for example, the twisting direction of the assembly 9 is opposite to the winding direction of the tape member 3, and when the composite cable 1 is distorted in a direction in which the assembly 9 is loosened (the diameter of the assembly 9 is increased), the tape member 3 is tightened in an opposite manner (the diameter of the tape member 3 is reduced) since the twisting direction of the assembly 9 is opposite to the winding direction of the tape member 3. At this time, the assembly 9 is being loosened but at the same time squeezed by the tape member 3. Thus, stress is applied to the assembly 9, resulting in that an excessive load is applied to a portion of the pair of first electric wires 5 or the twisted pair wire 8. In the present embodiment, the twisting direction of the assembly 9 and the winding direction of the tape member 3 are configured to be the same so that the assembly 9 and the tape member 3 are loosened or tightened synchronously. This allows the composite cable 1 to have improved distortion resistance.

When the twist pitch of the assembly 9 is reduced, the composite cable 1 becomes more flexible and is easily bent but distortion resistance decreases due to the reduced looseness of the twist. On the other hand, when the twist pitch of the assembly 9 is increased, distortion resistance is improved but flexibility decreases. In the present embodiment, since a load is dispersed by synchronously loosening or tightening the assembly 9 and the tape member 3 when being distorted, it is possible to provide enough distortion resistance even when the twist pitch of the assembly 9 is reduced to improve flexibility.

The twist pitch of the assembly 9 is desirably the same as the winding pitch of the tape member 3 so that the tape member 3 can enter the valley part between the first electric wires 5 or between the first electric wire 5 and the twisted pair wire 8 more easily. In this regard, the term "the twist pitch of the assembly 9 is the same as the winding pitch of the tape member 3" here is not limited to the perfect match between the twist pitch of the assembly 9 and the winding pitch of the tape member 3, and the twist pitch of the assembly 9 and the winding pitch of the tape member 3 may be slightly different (within ±10%).

The inwardly projecting part 10 is desirably formed throughout the longitudinal direction of the composite cable 1 but may have some gaps in the middle. In other words, in the composite cable 1, the inwardly projecting part 10 may not be formed at some portions in the longitudinal direction. For example, to improve workability at the time of termination, the composite cable 1 may be configured that the inwardly projecting part 10 is not formed (or the projecting length d of the inwardly projecting part 10 is reduced) at the end portions (with a predetermined distance from the end) by, e.g., changing the winding pitch of the tape member 3.

In addition, although both the tape member 3 and the sheath 4 protrude inward beyond the common tangent passing through the outer perimeters of the first electric wires 5, or the first electric wire 5 and the twisted pair wire 8, which are circumferentially adjacent to each other, it is not limited thereto. When using, e.g., a relatively thick tape member 3, the configuration may be such that only the tape member 3 protrudes inward beyond the common tangent. Even in this case, the sheath 4 needs to protrude inward (needs to be in contact with the outer peripheral surface of the tape member 3) at the inwardly projecting part 10.

Meanwhile, the twisting direction of the twisted pair wire 8 and the twisting direction of the assembly 9 may be the same. The twisting direction of the twisted pair wire 8 here is a direction that the second electric wires 6 rotate from the base end toward the front end along the circumferential direction of the twisted pair wire 8 when the composite cable 1 is viewed from the front end side (on the side where the tape member 3 overlaps upon itself).

When the twisting direction of the twisted pair wire 8 and the twisting direction of the assembly 9 are the same, the twist of the twisted pair wire 8 spontaneously unravels by unraveling the twist of the assembly 9 when terminating the cable and it is easy to unravel the electric wires 5 and 6. This improves disassembly capability of the composite cable 1 and thereby improves cable termination workability. In addition, when the twisting direction of the twisted pair wire 8 and the twisting direction of the assembly 9 are the same, the assembly 9 is twisted such that the twisted pair wire 8 and the first electric wires 5 are twisted together in a direction along the kink on the twisted pair wire 8 caused by twisting the two second electric wires 6. Therefore, when the composite cable 1 is bent, the pair of first electric wires 5 and the twisted pair wire 8 elongate or contract synchronously in the longitudinal direction of the composite cable 1. This allows the composite cable 1 to be bent easily and it is thereby possible to improve flexibility of the composite cable 1.

In addition, since all the twisting direction of the twisted pair wire 8, the twisting direction of the assembly 9 and the winding direction of the tape member 3 are the same in this case, the twisted pair wire 8 and the assembly 9 and the tape member 3 are loosened or tightened synchronously when the composite cable 1 is distorted, and it is thereby possible to further improve distortion resistance of the composite cable 1.

Furthermore, when the twisting direction of the twisted pair wire 8 and the twisting direction of the assembly 9 are the same, the assembly 9 is formed by twisting in a direction along the kink on the twisted pair wire 8. Therefore, when the sheath 4 is not manually removed but the sheath 4 and the tape member 3 are removed together by a dedicated stripping tool, etc., the first electric wires 5 and the twisted pair wire 8 tend to remain in the twisted state because of the influence of the kink on the twisted pair wire 8. Stripping work is carried out in several stages when the removal length of the sheath 4 for cable termination is long. In this case, since the twisting direction of the twisted pair wire 8 and the twisting direction of the assembly 9 are the same, the twisted state of the first electric wires 5 and the twisted pair wire 8 is maintained after each stripping work and the stripping work thus can be easily carried out in several stages.

When the twisting direction of the twisted pair wire 8 is the same as the twisting direction of the assembly 9, and if the twist pitch of the twisted pair wire 8 is the same as the twist pitch of the assembly 9, the position of the first electric wires 5 relative to the second electric wires 6 is always the same throughout the longitudinal direction and this may cause the deformed appearance of the composite cable 1. Therefore, the twist pitch of the twisted pair wire 8 is desirably different from the twist pitch of the assembly 9 (more specifically, not less than 10% and not more than 80% different from (smaller than) the twist pitch of the assembly 9). When the twist pitch of the twisted pair wire 8 is larger than the twist pitch of the assembly 9, the twist pitch of the twisted pair wire 8 may change at the time of twisting the assembly 9. Therefore, the twist pitch of the twisted pair wire 8 is desirably smaller than at least the twist pitch of the assembly 9.

Alternatively, the twisting direction of the twisted pair wire 8 may be different from the twisting direction of the assembly 9. When the twisting direction of the twisted pair wire 8 is different from the twisting direction of the assembly 9, the kink of the twisted pair wire 8 and the kink of the assembly 9 occur in the opposite directions and thus cancel out each other, and it is thereby possible to prevent kinking up and to reduce variation in bending properties in the cable longitudinal direction. In addition, a change in the twist pitch of the twisted pair wire 8 at the time of twisting the assembly 9 can be prevented by differing the twist direction of the twisted pair wire 8 from the twist direction of the assembly 9, and it is thus possible to form the assembly 9 while maintaining the twist pitch of the twisted pair wire 8.

When the twisting direction of the twisted pair wire 8 is different from the twisting direction of the assembly 9, and if the twist pitch of the twisted pair wire 8 is large, the twist of the twisted pair wire 8 may loosen when twisting the assembly 9. Therefore, the twist pitch of the twisted pair wire 8 is desirably smaller than at least the twist pitch of the assembly 9 so that the twist of the twisted pair wire 8 is less likely to unravel and the cross sectional shape of the assembly 9 is stabilized.

Whether the twisting direction of the twisted pair wire 8 and the twisting direction of the assembly 9 are the same or different can be appropriately determined according to characteristics required for the composite cable 1, such as termination processability or kink. In addition, regardless of whether the twisting direction of the twisted pair wire 8 and the twisting direction of the assembly 9 are the same or different, the twist pitch of the twisted pair wire 8 is desirably smaller than the twist pitch of the assembly 9.

Description of Composite Harness Using the Composite Cable 1

Figure 3:
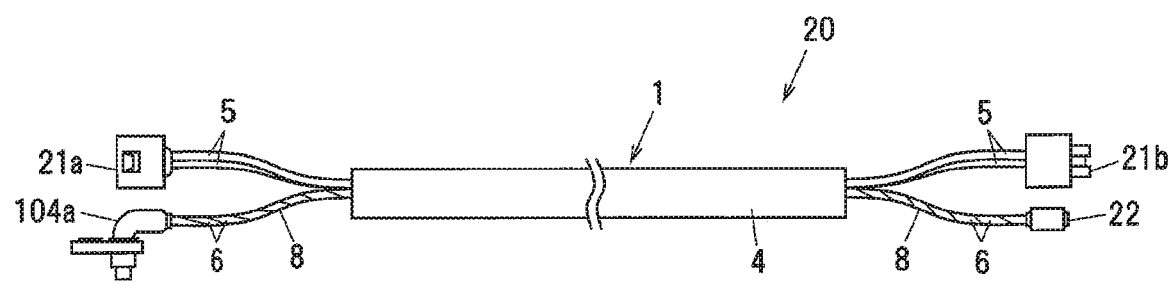
FIG. 3 is a schematic configuration diagram illustrating a composite harness in the embodiment of the invention.

FIG. 3 is a schematic configuration diagram illustrating a composite harness in the present embodiment.

As shown in FIG. 3, a composite harness 20 is composed of the composite cable 1 in the present embodiment and a connector attached to at least one of end portions of the first electric wires 5 and of the second electric wires 6.

In FIG. 3, an end portion on the wheel 102 side is shown on the left side and an end portion on the vehicle body 105 side (the junction box 106 side) is shown on the right side. In the following description, an end of the composite harness 20 on the wheel 102 side is referred to "one end" and another end on the vehicle body 105 side (the junction box 106 side) is referred to as "other end".

A wheel-side power connector 21a for connection to the EPB motor 101a is attached to one end of the pair of first electric wires 5, and a vehicle body-side power connector 21b for connection to the wire group 107 inside the junction box 106 is attached to the other end of the pair of first electric wires 5.

The ABS sensor 104a is attached to one end of the pair of second electric wires 6 (the twisted pair wire 8), and a vehicle body-side ABS connector 22 for connection to the wire group 107 inside the junction box 106 is attached to the other end of the pair of second electric wires 6 (the twisted pair wire 8).

Although the separate connectors are provided on the first electric wires 5 and the second electric wires 6 (the twisted pair wire 8) in this example, one dedicated connector may be provided so that both electric wires 5 and 6 are connected all together.

Functions and Effects of the Embodiments

As described above, the composite cable 1 in the present embodiment is configured that the twisting direction of the assembly 9 and the winding direction of the tape member 3 are the same, the tape member 3 and the sheath 4 have the inwardly projecting part 10 formed in a spiral along the cable longitudinal direction and formed so as to enter inward at least one of the valley parts formed between the two first electric wires 5 and between the first electric wires 5 and the twisted pair wire 8, and the inwardly projecting length d of the inwardly projecting part 10 from the outermost of the common tangents passing through the outer perimeters of the first electric wires 5, or the first electric wire 5 and the twisted pair wire 8, circumferentially adjacent with the inwardly projecting part 10 interposed therebetween is not less than 3% of the outer diameter of the first electric wire 5.

By having the inwardly projecting part 10 which enters the valley part between the two first electric wires 5 or the valley part between the first electric wire 5 and the twisted pair wire 8, hollow portions formed around the first electric wires 5 or the twisted pair wire 8 can be smaller than when not providing the inwardly projecting part 10, and buckling of the composite cable 1 can be prevented even when the composite cable 1 is bent or distorted.

In addition, since the inwardly projecting part 10 restricts movement of the tape member 3, it is possible to prevent the tape member 3 from moving in the cable longitudinal direction and thus possible to prevent such troubles that the tape member 3 overlaps itself at some portions of the composite cable 1 and causes a decrease in flexibility.

Furthermore, by forming the inwardly projecting part 10 so that the projecting length d thereof is not less than 3% of the outer diameter of the first electric wire 5, it is possible to reliably prevent buckling of the composite cable 1 and the movement of the tape member 3.

Furthermore, by providing the assembly 9 and the tape member 3 so that the twisting direction of the assembly 9 and the winding direction of the tape member 3 are the same, the tape member 3 can easily enter the valley part between the two first electric wires 5 or the valley part between the first electric wire 5 and the twisted pair wire 8 at the time of winding the tape member 3, and it is thus possible to easily manufacture the composite cable 1 having the inwardly projecting part 10.

Modifications

Figure 4:
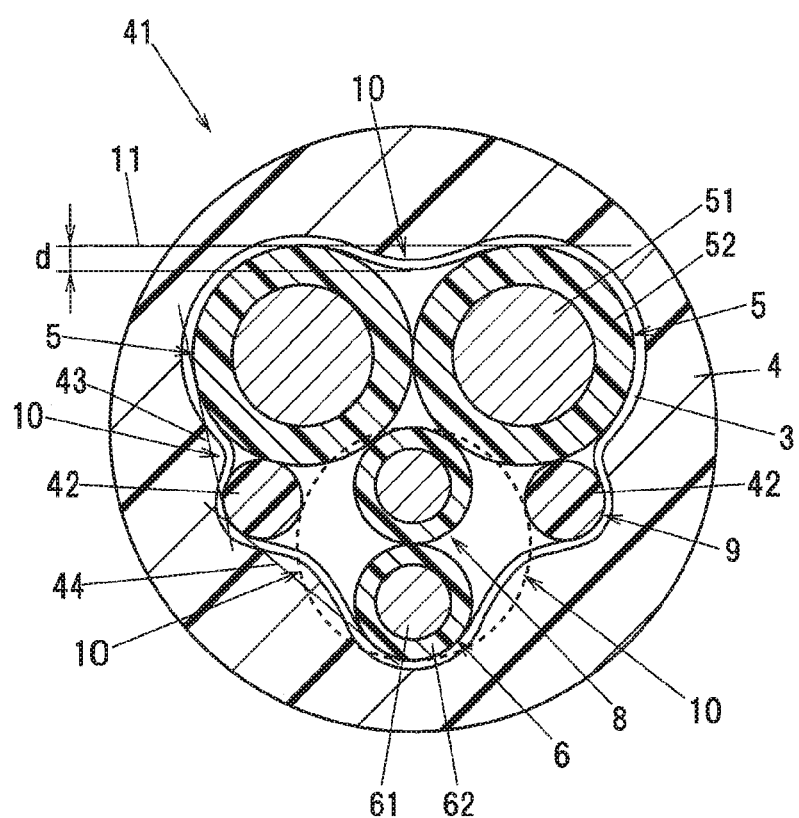
FIG. 4 is a cross sectional view showing a composite cable in a modification of the invention.

Although the assembly 9 is formed by twisting two first electric wires 5 and the twisted pair wire 8 together in the embodiment, the assembly 9 may be further provided with a pair of wire-shaped fillers (linear objects, dummy wires) 42 arranged on both circumferential sides of the twisted pair wire 8, as is in a composite cable 41 shown in FIG. 4. In this case, the assembly 9 is formed by twisting the pair of first electric wires 5, the twisted pair wire 8 and the pair of fillers 42 together.

By providing the pair of fillers 42, the composite cable 41 can have a cross-sectional shape much closer to a circle and thus have a good outer appearance, and it is also possible to prevent a problem such as difficulty in bending the composite cable 1 in a certain direction. The filler 42 is formed of, e.g., Teflon (registered trademark). The pair of fillers 42 have the same outer diameter and are arranged in contact with the first electric wires 5 and the twisted pair wire 8. The outer diameter of the filler 42 is smaller than the outer diameter of the first electric wire 5.

When the fillers 42 are provided, the inwardly projecting part 10 may be formed in a valley part between a filler 42 and the first electric wire 5 adjacent thereto, or in a valley part between the filler 42 and the twisted pair wire 8. In this case, the inwardly projecting part 10 in the valley part between the filler 42 and the first electric wire 5 is formed to protrude inward beyond a common tangent 43 passing through the outer perimeters of the filler 42 and the first electric wire 5, and the inwardly projecting part 10 in the valley part between the filler 42 and the twisted pair wire 8 is formed to protrude inward beyond a tangent 44 passing through the outer perimeters of the filler 42 and the twisted pair wire 8.

In addition, the sheath 4 has one layer in the embodiment but may have two or more layers. When providing the sheath 4 having two or more layers by performing extrusion coating for several times, the cross-sectional shape of the composite cable 1 can be more circular and the outer appearance is thereby improved.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A composite cable (1), comprising: a pair of first electric wires (5); a twisted pair wire (8) formed by twisting a pair of second electric wires (6) having a smaller outer diameter than the first electric wires (5); a tape member (3) wound into a spiral around an assembly (9) that is formed by twisting the pair of first electric wires (5) and the twisted pair wire (8) together; and a sheath (4) covering the outer periphery of the tape member (3), wherein a twisting direction of the assembly (9) and a winding direction of the tape member (3) are the same, the tape member (3) and the sheath (4) comprise an inwardly projecting part (10) formed in a spiral along a cable longitudinal direction and formed so as to enter inward at least one of a valley part between the two first electric wires (5) and valley parts between the first electric wires (5) and the twisted pair wire (8), and the inwardly projecting part (10) has a projecting length of not less than 3% of the outer diameter of the first electric wires (5) defined in projecting inside from the outermost of the common tangents passing through the outer perimeters of the first electric wires (5), or the first electric wire (5) and the twisted pair wire (8), circumferentially adjacent with the inwardly projecting part (10) interposed therebetween.

[2] The composite cable (1) defined by al, wherein the projecting length of the inwardly projecting part (10) is not less than 0.1 mm.

[3] The composite cable (1) defined by al or [2], wherein the inwardly projecting parts (10) are each formed in a valley part between the two first electric wires (5), a valley part between one of the first electric wires (5) and the twisted pair wire (8), and a valley part between another of the first electric wires (5) and the twisted pair wire (8).

[4] The composite cable (1) defined by any one of al to [3], wherein a twist pitch of the assembly (9) is equal to a winding pitch of the tape member (3).

[5] The composite cable (1) defined by any one of al to [4], wherein the first electric wire (5) comprises a power line for supplying a drive current to a motor (101a) for an electric parking brake (101) mounted on a wheel (102) of a vehicle (100).

[6] The composite cable (1) defined by any one of al to [5], wherein the second electric wire (6) comprises a signal line for a sensor mounted on a wheel (102) of a vehicle (100).

[7] The composite cable (41) defined by any one of [1] to [6], further comprising: a pair of wire-shaped fillers (42) that are arranged on both circumferential sides of the twisted pair wire (8), wherein the assembly (9) is formed by twisting the pair of first electric wires (5), the twisted pair wire (8) and the pair of fillers (42) together.

[8] The composite cable (41) defined by [7], wherein the inwardly projecting part (10) is formed in a valley part between the filler (42) and the first electric wire (5) adjacent thereto, or in a valley part between the filler (42) and the twisted pair wire (5).

[9] The composite cable (1) defined by any one of [1] to [8], wherein a twisting direction of the twisted pair wire (8) is the same as the twisting direction of the assembly (9).

[10] The composite cable (1) defined by any one of [1] to [8], wherein the twisting direction of the twisted pair wire (8) is different from the twisting direction of the assembly (9).

[11] The composite cable (1) defined by any one of [1] to [10], wherein at least a portion of the second electric wire (6)

is arranged in an inner valley part between the pair of the first electric wires (5), and the tape member (3) is in contact with all the pair of first electric wires (5) and the pair of second electric wires (6) that constitute the assembly (9).

[12] A composite harness (20), comprising: the composite cable (1) defined by any one of [1] to [11]; and a connector attached to at least one of end portions of the first electric wires (5) and of the second electric wires (6).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

REFERENCE SIGNS LIST

1 COMPOSITE CABLE
3 TAPE MEMBER
4 SHEATH
5 FIRST ELECTRIC WIRE
6 SECOND ELECTRIC WIRE
8 TWISTED PAIR WIRE
9 ASSEMBLY
10 INWARDLY PROJECTING PART

The invention claimed is:

1. A composite cable, comprising:
   a pair of first electric wires;
   a twisted pair wire formed by twisting a pair of second electric wires having a smaller outer diameter than the pair of first electric wires;
   a tape member wound into a spiral around an assembly that is formed by twisting the pair of first electric wires and the twisted pair wire together; and
   a sheath covering an outer periphery of the tape member,
   wherein a twisting direction of the assembly and a winding direction of the tape member are same,
   wherein the tape member and the sheath comprise an inwardly projecting part formed in a spiral along a cable longitudinal direction and formed so as to enter inward at least one of a valley part between the pair of first electric wires and valley parts between the pair of first electric wires and the twisted pair wire, and
   wherein the inwardly projecting part has a projecting length of not less than 3% of an outer diameter of the pair of first electric wires defined in projecting inside from an outermost of common tangents passing through outer perimeters of the pair of first electric wires, or g first electric wire of said pair of first electric wires, and the twisted pair wire, circumferentially adjacent with the inwardly projecting part interposed therebetween,
   wherein a twist pitch of the twisted pair wire is smaller than a twist pitch of the assembly and a winding pitch of the tape member.

2. The composite cable according to claim 1, wherein the projecting length of the inwardly projecting part is not less than 0.1 mm.

3. The composite cable according to claim 1, wherein inwardly projecting parts are each formed in a valley part between the first electric wire and another first electric wire of the pair of first electric wires, a valley part between one first electric wire of said pair of first electric wires and the twisted pair wire, and a valley part between another first electric wire of said pair of first electric wires and the twisted pair wire.

4. The composite cable according to claim 1, wherein a twist pitch of the assembly is equal to a winding pitch of the tape member.

5. The composite cable according to claim 1, wherein the first electric wire of said pair of first electric wires comprises a power line for supplying a drive current to a motor for an electric parking brake mounted on a wheel of a vehicle.

6. The composite cable according to claim 1, wherein the pair of second electric wires comprises a signal line for a sensor mounted on a wheel of a vehicle.

7. The composite cable according to claim 1, further comprising a pair of wire-shaped fillers that are arranged on both circumferential sides of the twisted pair wire,
   wherein the assembly is formed by twisting the pair of first electric wires, the twisted pair wire and the pair of fillers together.

8. The composite cable according to claim 7, wherein the inwardly projecting part is formed in a valley part between the filler and the first electric wire of said pair of first electric wires, adjacent thereto, or in a valley part between the filler and the twisted pair wire.

9. The composite cable according to claim 1, wherein a twisting direction of the twisted pair wire is same as the twisting direction of the assembly.

10. The composite cable according to claim 1, wherein the twisting direction of the twisted pair wire is different from the twisting direction of the assembly.

11. The composite cable according to claim 1, wherein at least a portion of the pair of second electric wires is arranged in an inner valley part between the pair of the first electric wires, and the tape member is in contact with all the pair of first electric wires and the pair of second electric wires that constitute the assembly.

12. A composite harness, comprising:
   the composite cable according to claim 1; and
   a connector attached to at least one of end portions of the pair of first electric wires and of the pair of second electric wires.

13. The composite cable according to claim 1, wherein the twist pitch of the twisted pair wire is not less than 10% smaller than the twist pitch of the assembly.

14. The composite cable according to claim 1, wherein the twist pitch of the twisted pair wire is not more than 80% smaller than the twist pitch of the assembly.

15. The composite cable according to claim 1, wherein the twist pitch of the twisted pair wire is not less than 10% smaller than the twist pitch of the assembly and not more than 80% smaller than the twist pitch of the assembly.

16. The composite cable according to claim 1, wherein the twist pitch of the assembly is not greater than 10% smaller than the winding pitch of the tape member.

17. The composite cable according to claim 1, wherein the twist pitch of the assembly is not greater than 10% larger than the winding pitch of the tape member.

18. The composite cable according to claim 1, wherein the twist pitch of the assembly is not greater than 10% smaller or larger than the winding pitch of the tape member.

* * * * *